United States Patent
Wong

(10) Patent No.: US 10,997,112 B2
(45) Date of Patent: May 4, 2021

(54) LINK INTERFACE

(71) Applicant: INTERNATIONAL BUSINESS MACHINES CORPORATION, Armonk, NY (US)

(72) Inventor: Kelvin Wong, Eastleigh (GB)

(73) Assignee: International Business Machines Corporation, Armonnk, NY (US)

( * ) Notice: Subject to any disclaimer, the term of this patent is extended or adjusted under 35 U.S.C. 154(b) by 0 days.

(21) Appl. No.: 16/591,035

(22) Filed: Oct. 2, 2019

(65) Prior Publication Data

US 2021/0103545 A1  Apr. 8, 2021

(51) Int. Cl.
| | |
|---|---|
| *G06F 13/42* | (2006.01) |
| *H04L 12/721* | (2013.01) |
| *G06F 13/16* | (2006.01) |
| *G06F 13/40* | (2006.01) |
| *G06F 13/38* | (2006.01) |

(52) U.S. Cl.
CPC ...... *G06F 13/4221* (2013.01); *G06F 13/1668* (2013.01); *G06F 13/38* (2013.01); *G06F 13/4068* (2013.01); *H04L 45/66* (2013.01)

(58) Field of Classification Search
CPC .. G06F 13/1668; G06F 13/38; G06F 13/4068; G06F 13/4072; G06F 13/42; G06F 13/4221; H04L 45/66
See application file for complete search history.

(56) References Cited

U.S. PATENT DOCUMENTS

| | | | | |
|---|---|---|---|---|
| 5,233,348 A | * | 8/1993 | Pollmann | H03M 7/425 341/67 |
| 5,343,195 A | * | 8/1994 | Cooper | H03M 7/425 341/106 |
| 5,666,116 A | * | 9/1997 | Bakhmutsky | H03M 7/425 341/67 |
| 6,496,540 B1 | * | 12/2002 | Widmer | H03M 5/04 341/59 |
| 7,010,607 B1 | * | 3/2006 | Bunton | H04L 1/18 709/228 |
| 9,306,863 B2 | | 4/2016 | Birrittella | |
| 9,910,809 B2 | | 3/2018 | Halleck et al. | |
| 10,152,446 B2 | | 12/2018 | Iyer et al. | |
| 2003/0093632 A1 | * | 5/2003 | Osborne | G06F 13/161 711/154 |
| 2015/0180782 A1 | * | 6/2015 | Rimmer | H04L 49/70 370/236 |

OTHER PUBLICATIONS

"OpenCAPI 3.0 Data Link Layer Specification". Version 1.2. Mar. 21, 2017. OpenCAPI Consortium. (Year: 2017).*
Pending U.S. Appl. No. 16/921,316, filed Jul. 6, 2020, entitled: "Efficient Error Reporting in a Link Interface", 41 pages.
IBM: List of IBM Patents or Patent Applications Treated as Related (Appendix P), Jul. 6, 2020, pp. 1-2.

* cited by examiner

Primary Examiner — Thomas J. Cleary
(74) Attorney, Agent, or Firm — Erik K. Johnson

(57) ABSTRACT

Concepts for a link interface of a communication protocol are presented. Where the communication protocol provides for Idle Flits of first and second sizes for maintaining link continuity, the first size being smaller than the second size, such concepts are configured to remove Idle flits of the first size.

15 Claims, 11 Drawing Sheets

LINK INTERFACE

BACKGROUND

The present invention relates generally to the field of link interfaces, and in particular to link interfaces that are configured to transmit and receive Flow Control Digits (Flits) via a link.

The present invention also relates to a method for a link interface of a communication protocol which supports transmitting and receiving Flits via a link.

The present invention also relates to a computer program product comprising computer-readable program code that enables a processor of a system, or a number of processors of a network, to implement such a method.

Link interfaces support data transfer been a host processor and a device. Such interfaces may adhere to a communication protocol which provides a standard for data transfer and may support control and response packets to be passed between the host processor and a device. An example of such a communication protocol is OpenCAPI. OpenCAPI is a data transfer standard that allows control and response packets to be passed between a host processor and an OpenCAPI device.

FIG. 1 shows the standard upstream and downstream data flow between host and device 100, known as the OpenCAPI Stack. From FIG. 1 it can be seen that an OpenCAPI interface in a host processor is divided into three parts: Transaction Layer (TL), Data Link Layer (DL) and the Physical Layer (PHY). Similarly, an OpenCAPI interface of an OpenCAPI device is sub-divided in the same manner, except that the Physical, Transaction and Data Link Layers are denoted "PHYX", "TLX" and "DLX" respectively.

The host processor forms control packets in the TL and forwards these to the DL. The DL is further sub-divided into a Transmit (Tx) and Receive (Rx) side. The Tx side of the DL adds what is termed "DL Content" to the incoming TL control packet to form a Flow Control Digit (Flit). This Flit is then serialised by the PHY layer and sent to the device.

At the device end, an incoming serial stream is formatted back into Flits by the PHYX layer. The Rx side of the DLX layer then takes these Flits, checks for correct CRC and examines the DL Content to determine whether it needs to be forwarded to the TLX layer). If this is so, the TLX layer decodes the control packet and, based on its content, instructs an AFU (Attached Functional Unit) of the device, which contains the bulk of the device's functionality, to carry out the Host's instruction.

Once the command is carried out, the device issues a response packet which is formatted by the TLX layer and then the DLX layer into another Flit (in a similar way that the TL and DL did this for the host in the downstream direction). The packet is then serialised via PHYX and sent, upstream, to the Host Processor.

For typical link interfaces (including those employing OpenCAPI), once a link between Host and Device is up and running, Flits must be sent continuously in both directions in order to maintain link continuity. For this reason, such link interfaces provide for Idle Flits (or Null Flits) to be transmitted. Any Idle Flits are not forwarded to the TL(X) level. Because Idle Flits may be of differing sizes, they may not necessarily appear conveniently aligned on a Flit_In bus. For example, part of an Idle Flit may appear in a portion of the Flit_In bus on one cycle and the remainder of the Idle Flit will then appear at the next cycle. Conventional link interfaces only cater for receiving Idle Flits of a single, fixed size.

SUMMARY

The present invention seeks to provide a link interface of a communication protocol.

The present invention also seeks to provide a processor comprising a proposed link interface, and a device comprising a proposed link interface.

The present invention also seeks to provide a computer-implemented method for a link interface of a communication protocol.

The present invention further seeks to provide a computer program product including computer program code for implementing a proposed method when executed by a processing unit. The present invention also seeks to provide a processing system adapted to execute this computer program code.

According to an aspect of the invention, there is provided a link interface of a communication protocol. The link interface comprises a physical layer of the communication protocol configured to transmit and receive Flits via a link. The link interface also comprises a data link layer configured to transmit and receive Flits to/from the physical layer. The communication protocol provides for Idle Flits of first and second sizes for maintaining link continuity, the first size being smaller than the second size. The data link layer is configured to remove Idle flits of the first size received from the physical layer.

According to another aspect of the invention, there is provided a computer-implemented method for a link interface of a communication protocol. The method comprises, at a physical layer of the link interface, transmitting and receiving Flits via a link, the physical layer being of the communication protocol. The method also comprises, at a data link layer of the link interface, transmitting and receiving Flits to/from the physical layer. The communication protocol provides for Idle Flits of first and second sizes for maintaining link continuity, the first size being smaller than the second size. The method further comprises, at the data link layer of the link interface, removing Idle Flits of the first size received from the physical layer.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. The at least one processor is adapted to execute the computer program code of said computer program product.

BRIEF DESCRIPTION OF THE SEVERAL VIEWS OF THE DRAWINGS

Preferred embodiments of the present invention will now be described, by way of example only, with reference to the following drawings, in which:

Figure 5A:
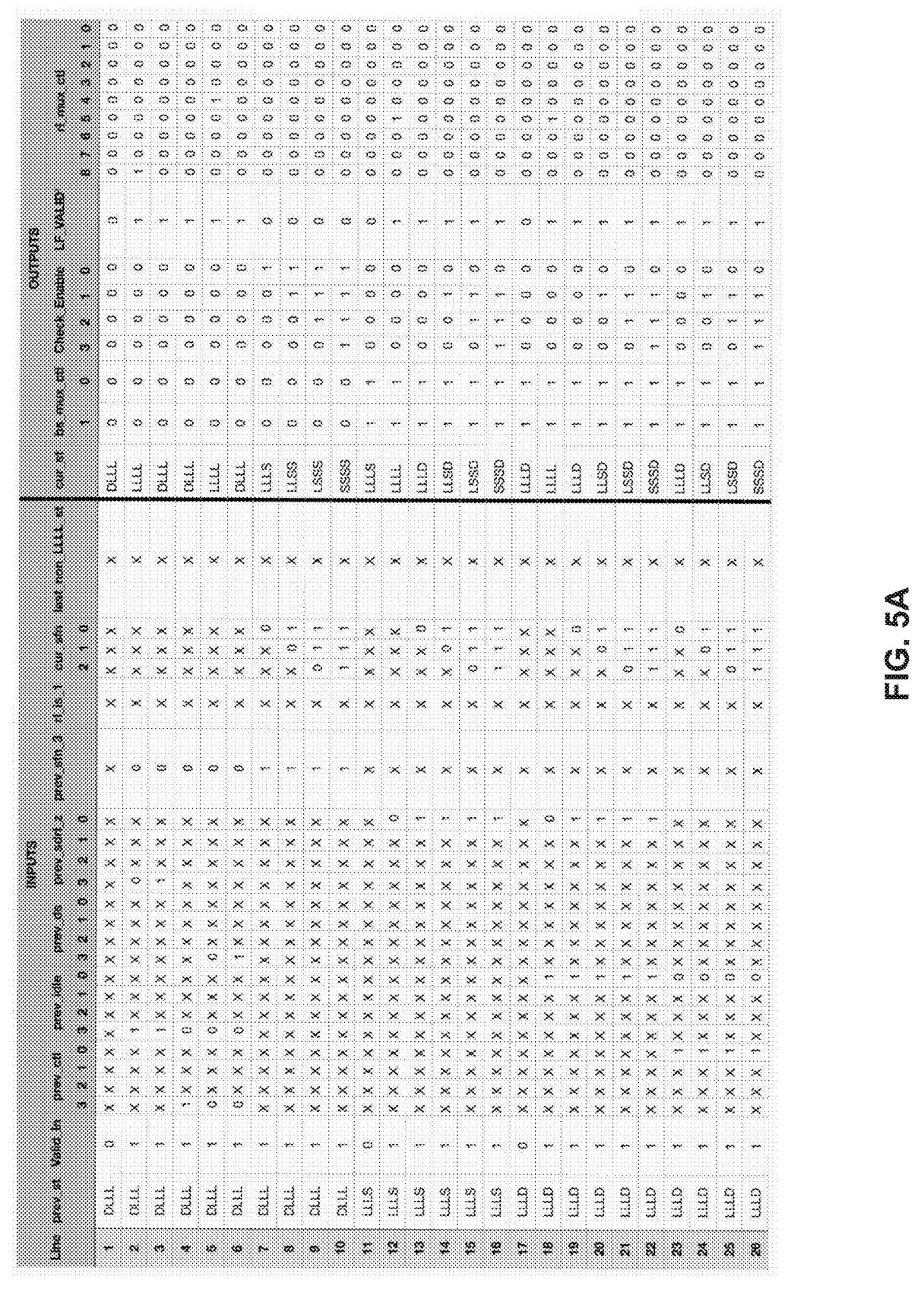
Figure 5B:
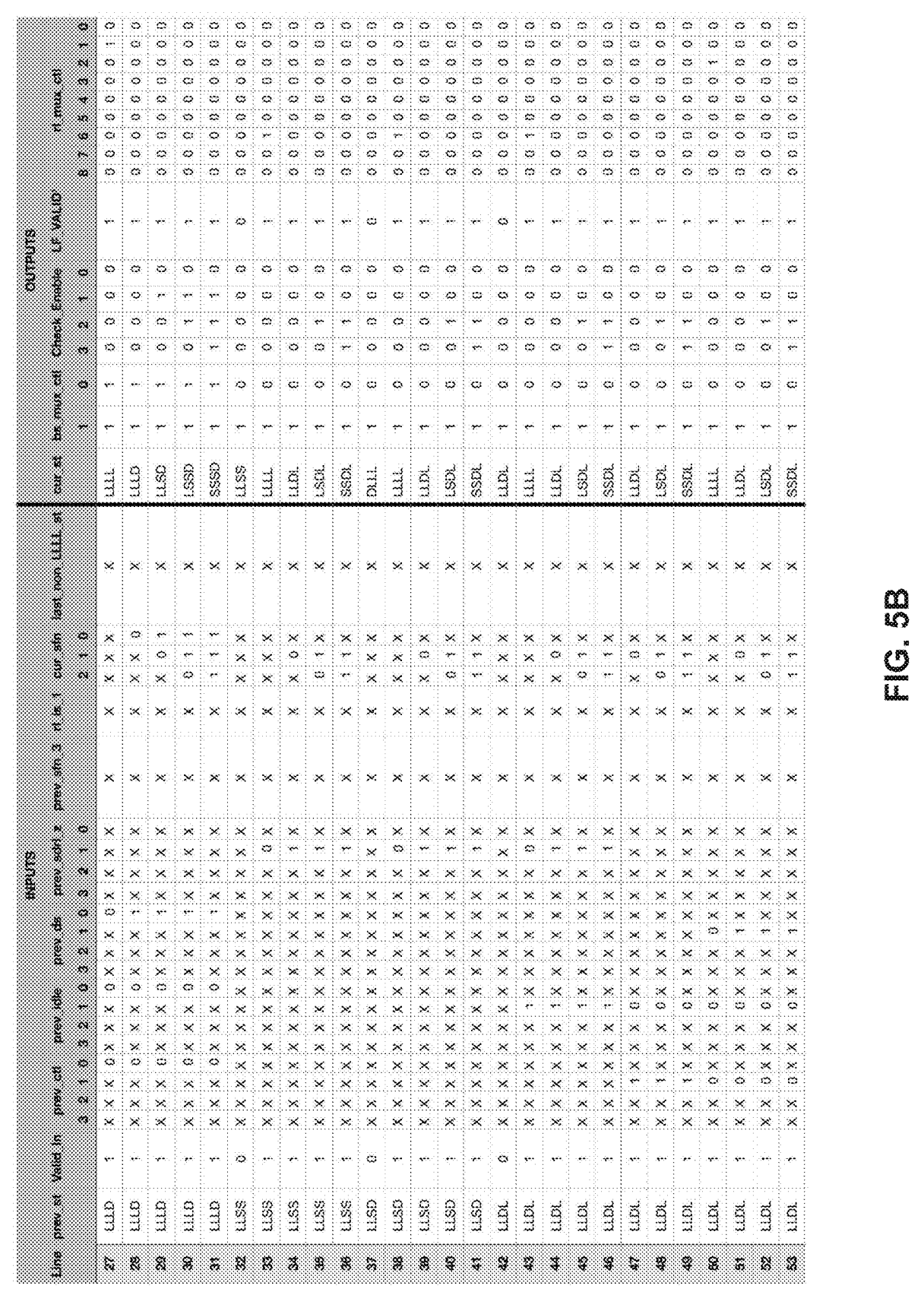
Figure 5C:
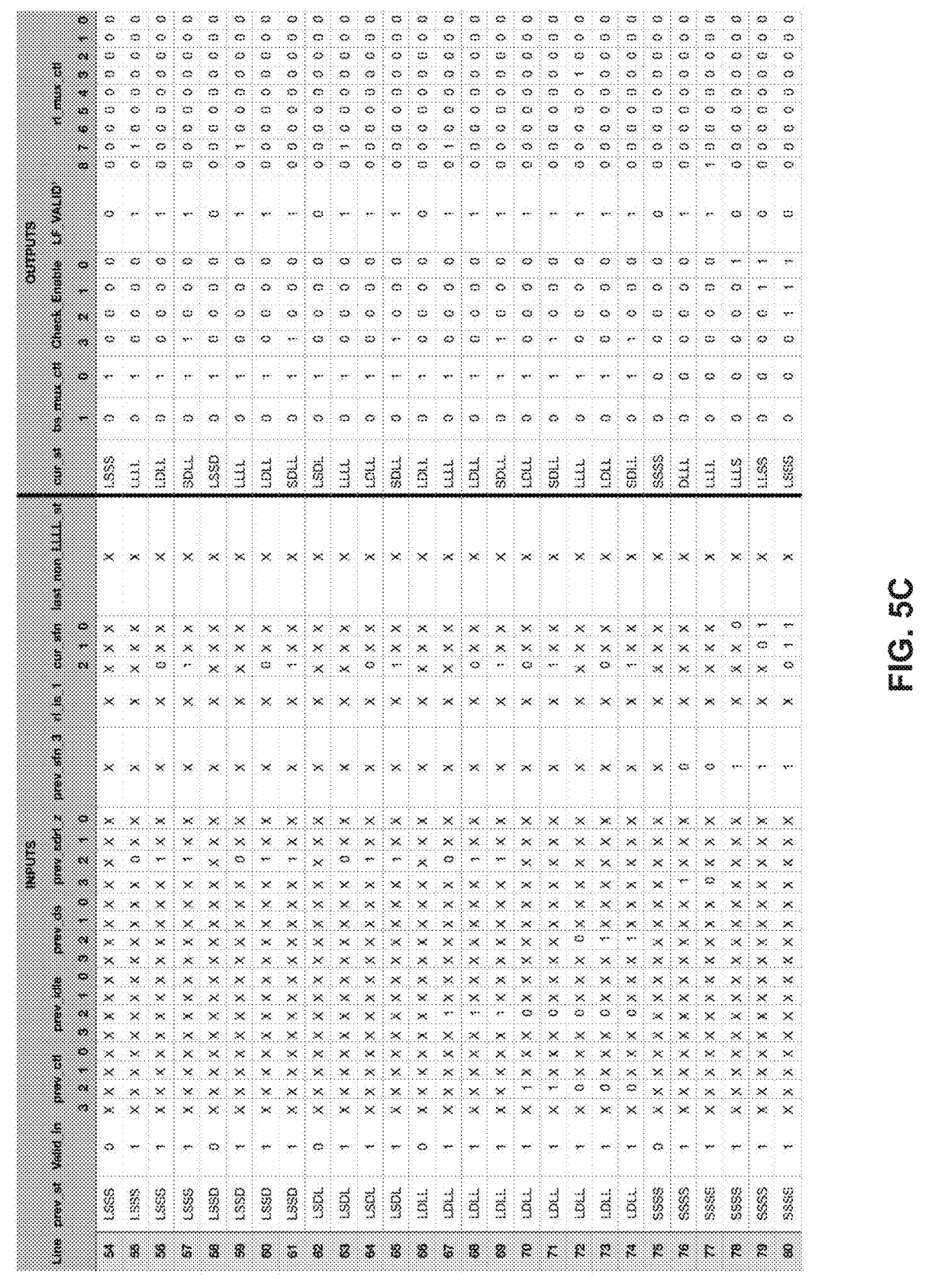
Figure 5D:
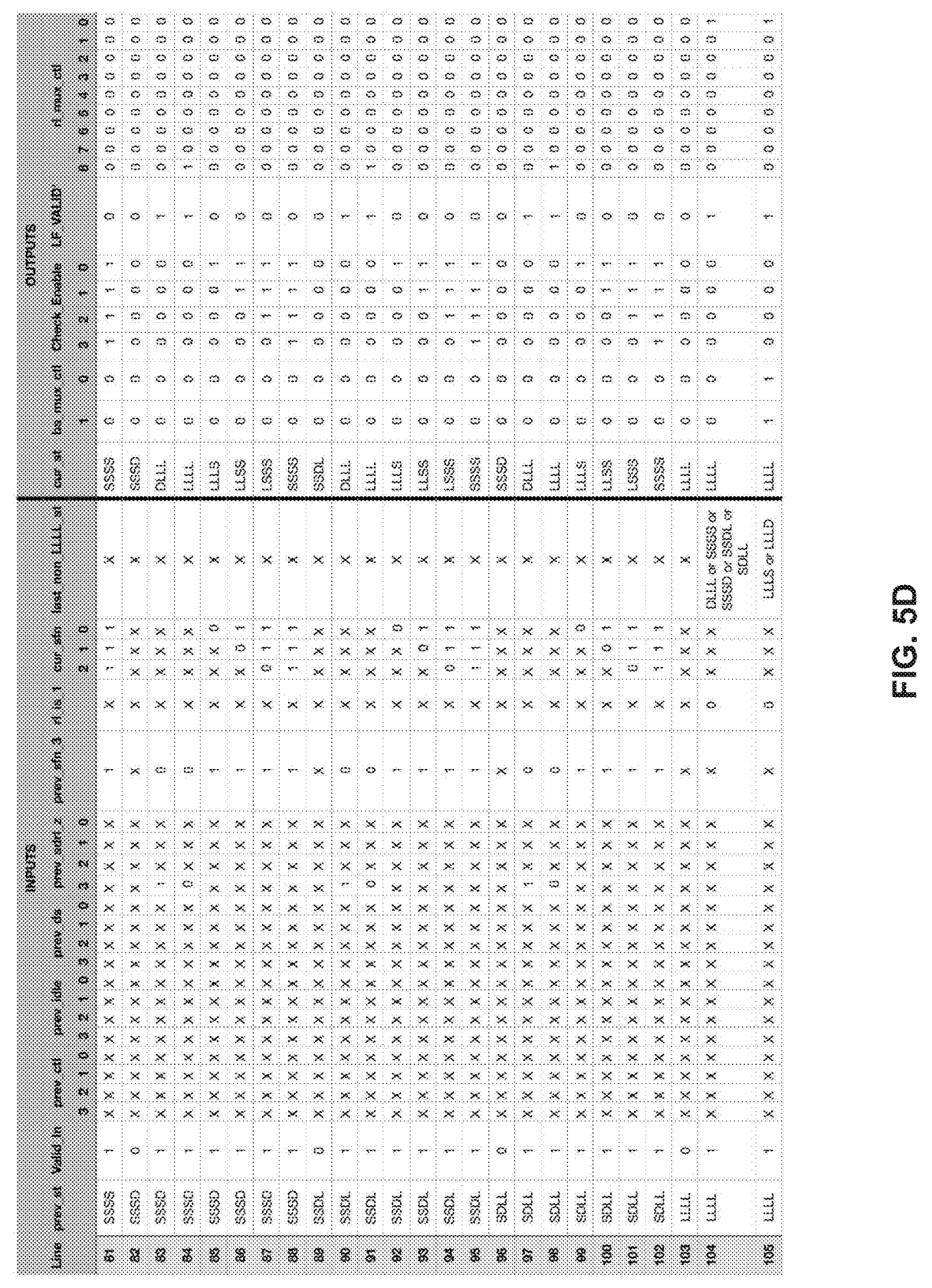
Figure 5E:
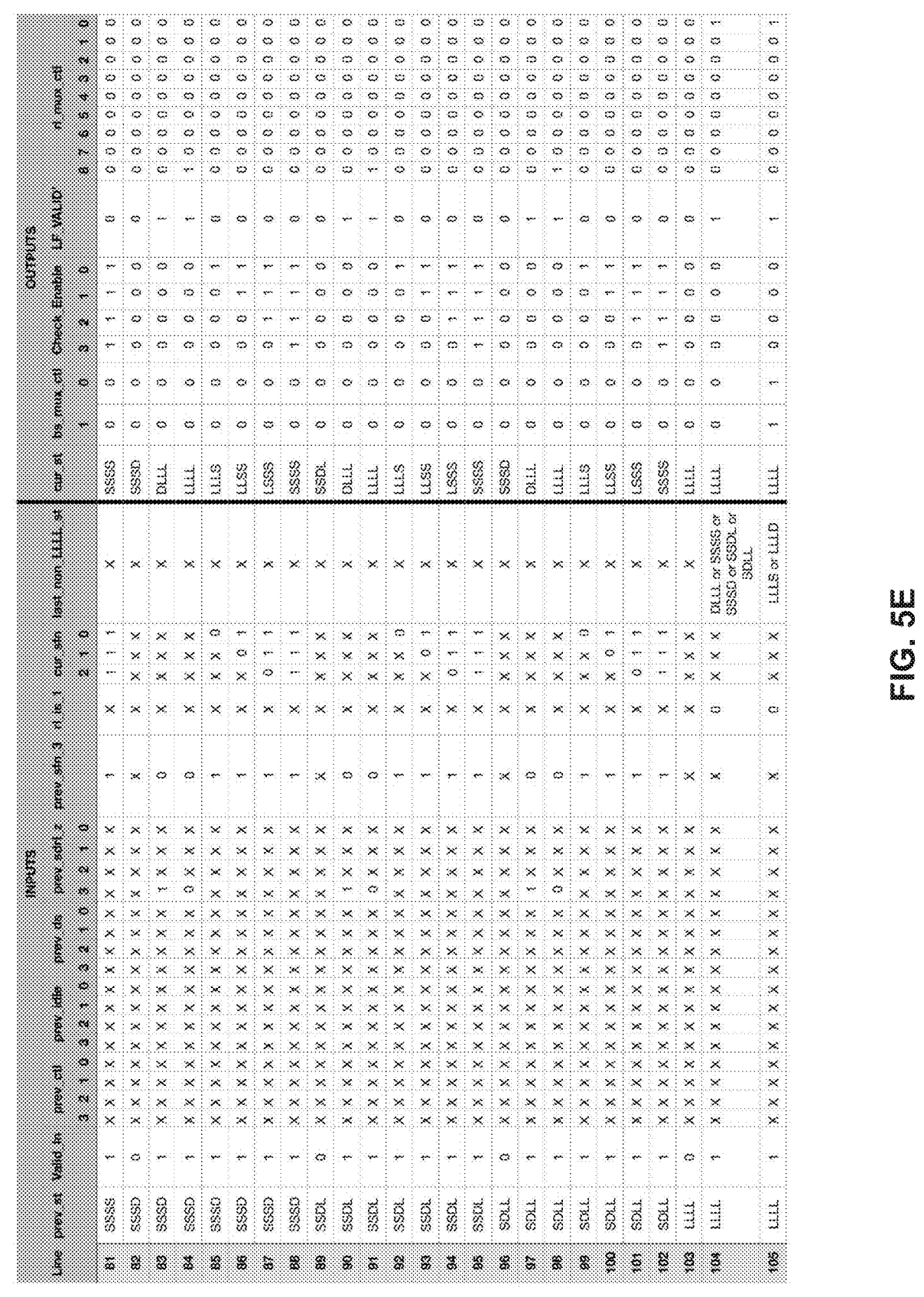
Figure 5F:
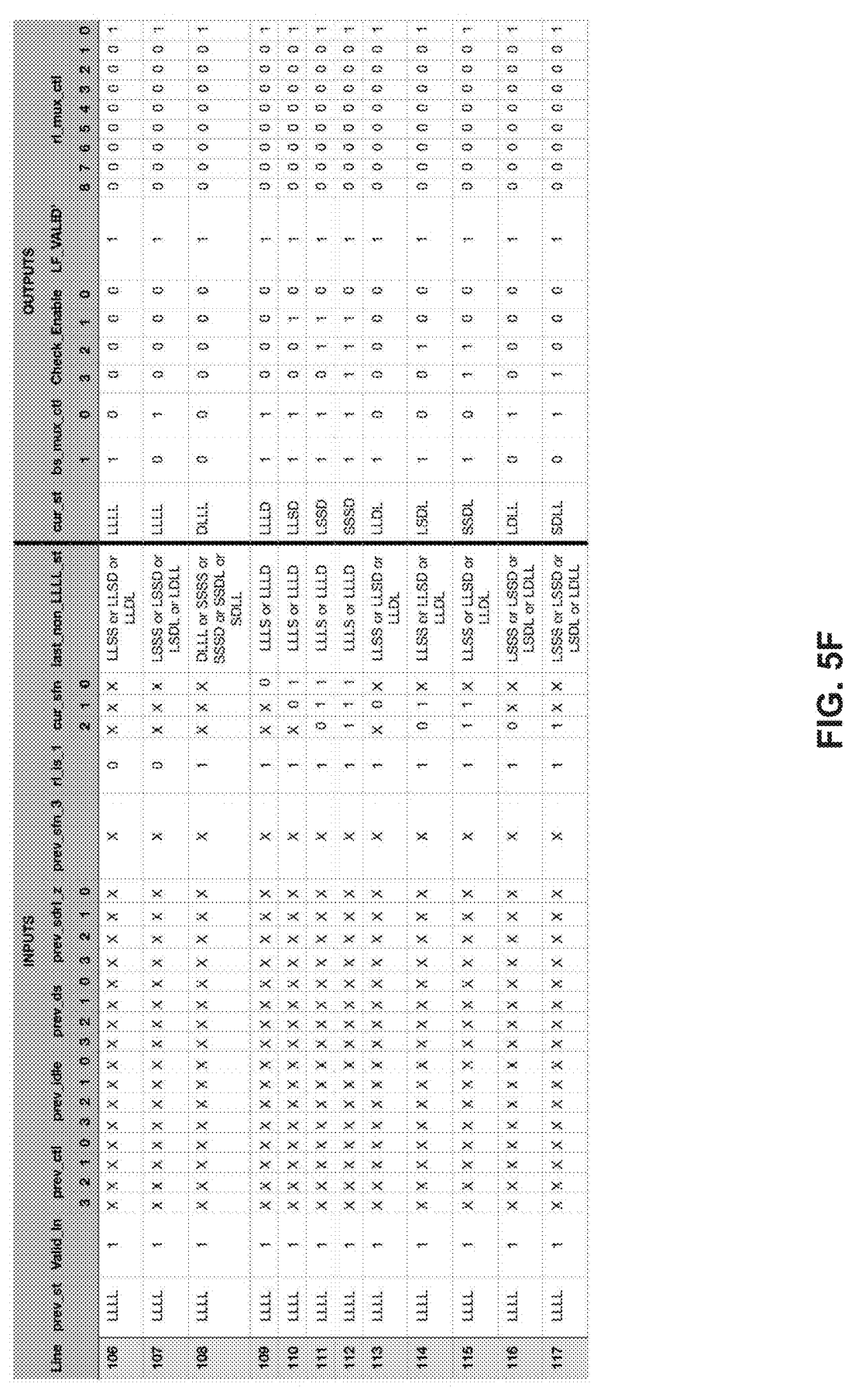

FIGS. 5A-5F depict an exemplary truth table for the Finite State Machine of FIG. 3.

DETAILED DESCRIPTION

Figure 1:
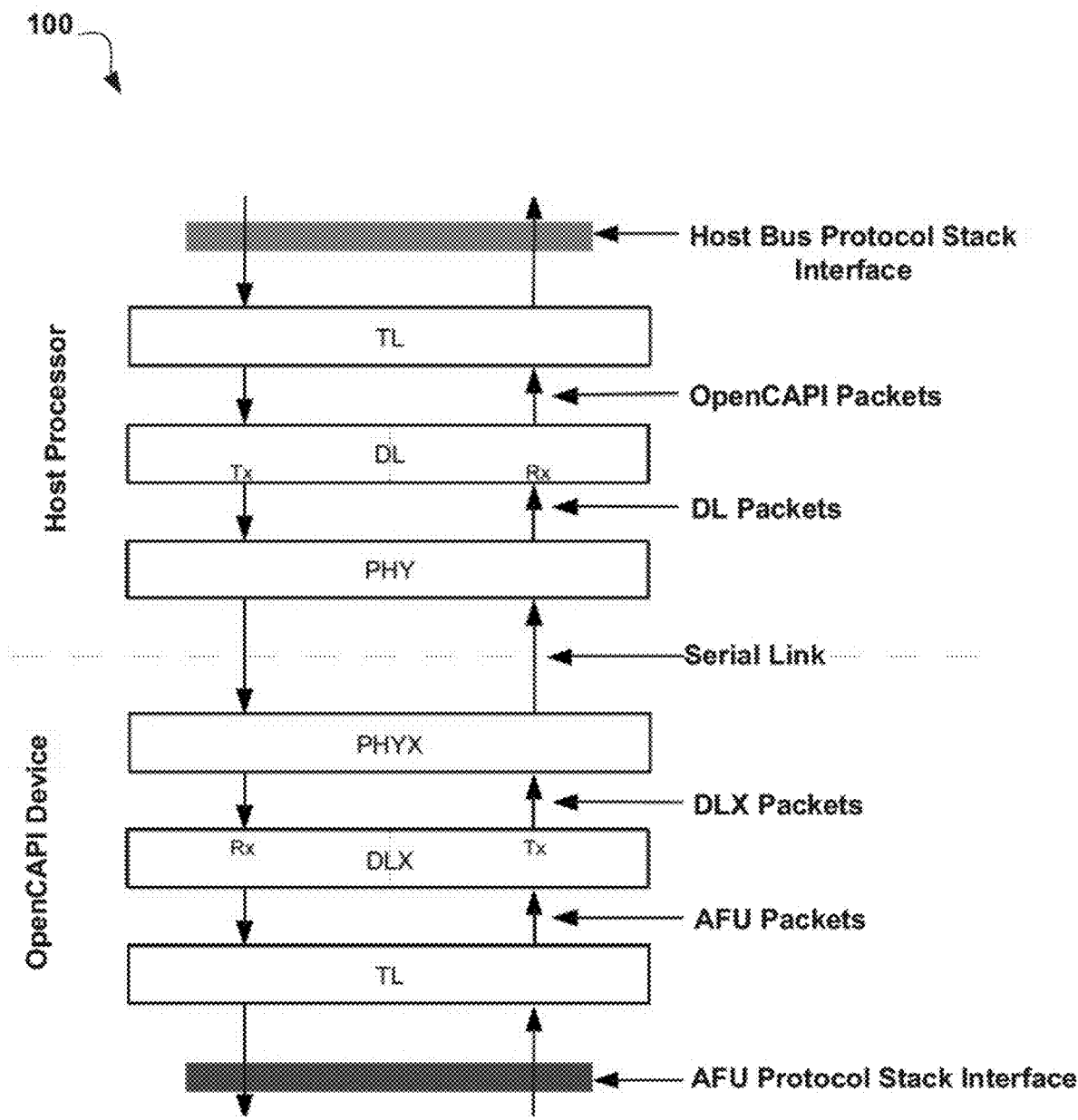
FIG. 1 illustrates the standard upstream and downstream data flow between a host and device implementing the OpenCAPI protocol.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for removing (i.e. filtering out) Idle Flits at a data link (e.g. DL or DLX) level of a link interface, thereby only allowing Control or Data Flits to be passed onto the transaction layer (e.g. TL or TLX) of the link interface.

In particular, where the communication protocol provides for Idle Flits of first and second sizes for maintaining link continuity, the first size being smaller than the second size, embodiments propose that the data link layer is configured to remove Idle Flits of the first size received from the physical layer.

The presence of Idle Flits of the first, smaller size (e.g. 'Short' Idle Flits) means that Flits of the second (e.g. standard-length) size, such as Control Flits, Data Flits or 'Long' Idle Flits, may not necessarily appear conveniently aligned on a Flit_In bus. Part of a standard-length Flit may appear in a portion of the Flit_In bus on one cycle and the remainder of the flit will appear at the next cycle. Unlike conventional link interfaces which only cater for receiving Flits of the second (e.g. standard-length) size, proposed embodiments may cater for random mixtures of Idle Flits of two differing sizes (e.g. Long and Short Idle Flits). In this way, proposed embodiments need not place a restriction on the type of Idle Flit traffic they can receive and may therefore be compatible with a wide range of device (such as all OpenCAPI devices for example).

Proposed embodiments are directed to a concept of removing (i.e. filtering out) Short Idle Flits (e.g. Idle Flits of a smaller of two permitted sizes) in a data link layer of a link interface. Such embodiments may, however, also be configured to remove Long Idle Flits. In this way, proposed embodiments may be configured to remove Short Idle Flits and Long Idle Flits (e.g. Idle Flits of two different permitted sizes), and this may be achieved irrespective of the order in which the Flits appear (assuming the sequence adheres to the appropriate communication protocol).

Embodiments may enable the data link (DL or DLX) layer to cope with any combination of Idle Flits of two differing lengths (e.g. Short and Long Idle Flit) coming in from the other end of a link. Unlike, conventional link interface designs (which can only cope with Idle Flits of standard length, embodiments may provide compliance and full flexibility with respect to various communication protocols (such as the OpenCAPI specification) with regard to handling Idle Flits.

In some embodiments, the data link layer comprises a Flit filter component configured to determine if a current Flit received from the physical layer for a current processing cycle is an idle flit of the first size based on a previous Flit received from the physical layer for a previous cycle. By way of example, the Flit filter component may comprise a finite state machine configured to change states based on a type of the current Flit and a type of the previous Flit. The Flit filter component may also comprise a barrel shifter comprising a plurality of registers of the first size. The finite state machine may then be configured to control the barrel shifter based on its state.

By way of example, an Idle Flit of first size may be n bits in length, and an Idle Flit of second size may be of m*n bits in length (wherein n and m are integers). In particular, in proposed embodiments, n may be equal to 128, and m may be equal to 4. Such embodiments may be configured for use with a 512-bit Flit_In bus that is designed to cater for 512 bit Control Flits, Data Flits, and Long Idle Flits. For example, wherein the communication protocol may comprise the OpenCAPI protocol. An Idle Flit of the first size may thus comprises a Short Idle Flit, and an Idle Flit of the second size may thus comprise a Long Idle Flit. Accordingly, proposed embodiments may provide compliance and full flexibility with the OpenCAPI specification with regard to handling Idle Flits.

As detailed above, embodiments propose the removal (i.e. filtering) of Idle Flits on the receive side of the Data Link Layer (DL or DLX) of a link interface. Such embodiments may be configured to monitor the types of Flits: either Short Idle, Long Idle, Control or Data on an incoming Flit_In bus whenever PHY(X) layer asserts a Valid_In. By determining what Flits are currently on the Flit_In bus and by referring to flits from Flit_In that were present on the previous cycle (that Valid_In=1), embodiments may filter out both Short and Long Idle Flits irrespective of which order the Flits appear in.

As will be described in more detail below, determining what currently appears on the Flit_In bus may depend largely on what appeared on the bus during the previous cycle Valid_In=1. Proposed embodiments may there be configured to 'remember' the previous state of Flit_In to help it determine the current state of Flit_In. For example, a Finite State Machine may be employed such that a current state of Flit_In is dependent on a previous state of Flit_In. This may enable the Data Link layer to cater for any combination of Short and Long Idles arriving from the other end of the link.

By way of further explanation, proposed embodiments will now be described with reference to a link interface employing the OpenCAPI protocol, wherein a Data Flit simply contains 512 bits of data that the TL or TLX layer wishes to transmit. A Data Flit does not contain a DL content section, whereas a Control Flit or Idle Flit does.

The 512-bit Flit_In and Flit_Out buses are both divided into four 128-bit lanes:
Bits 512:384=Lane 3
Bits 384:256=Lane 2
Bits 255:128=Lane 1
Bits 127:0=Lane 0

Within each lane there exists either a Short Flit or a 128-bit portion of a Long Flit. A 128-bit portion of a Long Flit will either contain DL content or not. In order to represent what is occupying a lane the following symbols are designated: 'S' indicates that a Short Idle Flit occupies a lane, 'L' denotes a 128-bit portion of a Long Flit that does not contain DL content whilst 'D' indicates a 128-bit portion of a Long Flit that does contain DL content.

Since a Control Flit or a Long Idle Flit are both 512-bit Flits containing DL content, they are made up of one 'D' and three 'L' symbols and can be denoted as "DLLL". Since a Data Flit is a 512-bit Flit that purely contains data (i.e. no DL content), it is made up of four 'L's and can thus be denoted as "LLLL".

Figure 2:
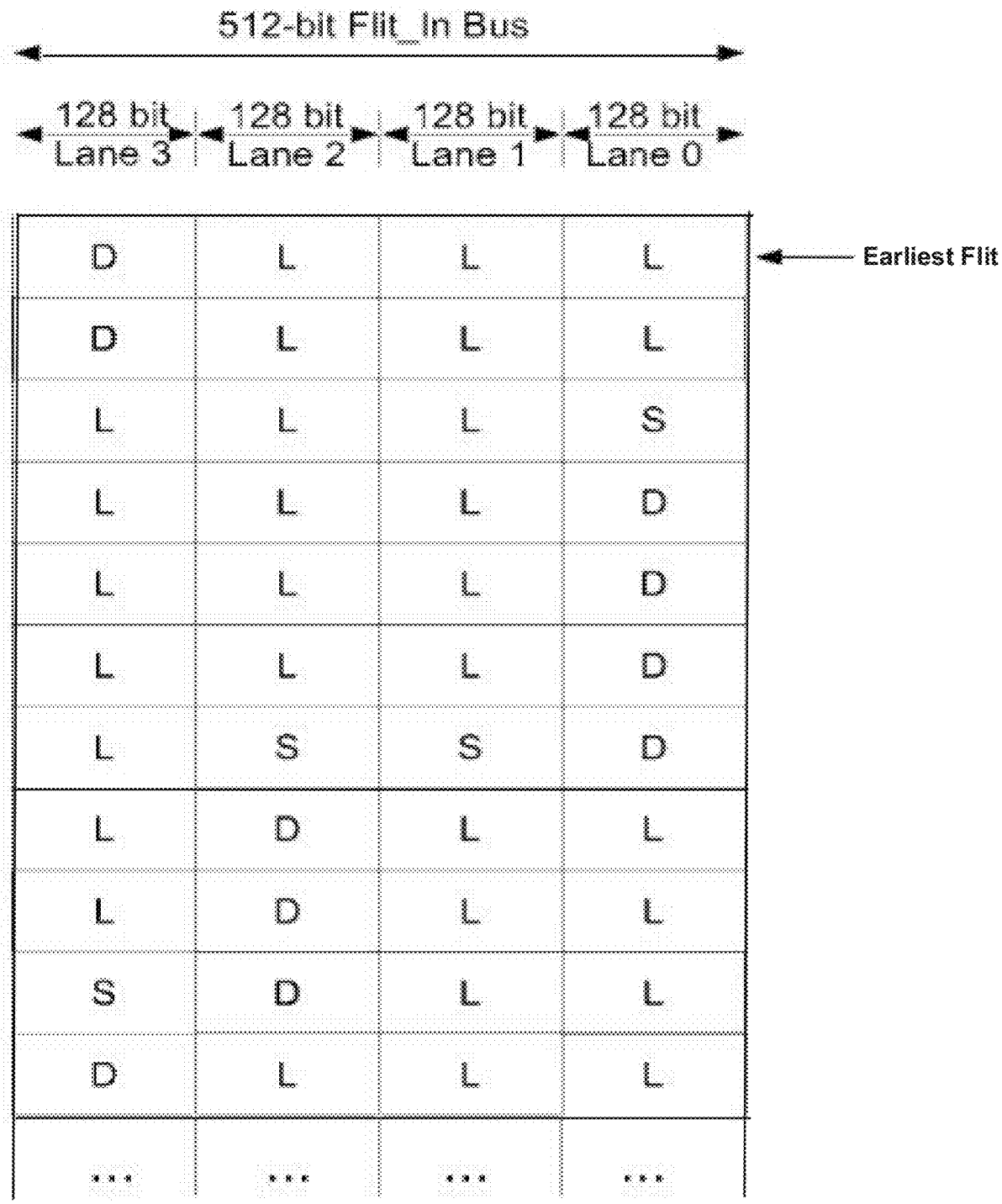
FIG. 2 depicts an exemplary sequence of Flits received on a Flit_In bus, wherein the Flits are represented using a 'D-L-S notation'.

FIG. 2 depicts a sequence of Flits received on a Flit_In bus, wherein the Flits are represented using the above mentioned 'D-L-S notation'. Each row in FIG. 2 showing the locations of D-L-S on the Flit_In bus represents the state of Flit_In on each cycle. For instance, in FIG. 2, the first state of the Flit_In bus is "DLLL" and the third state is "LLLS".

Figure 3:
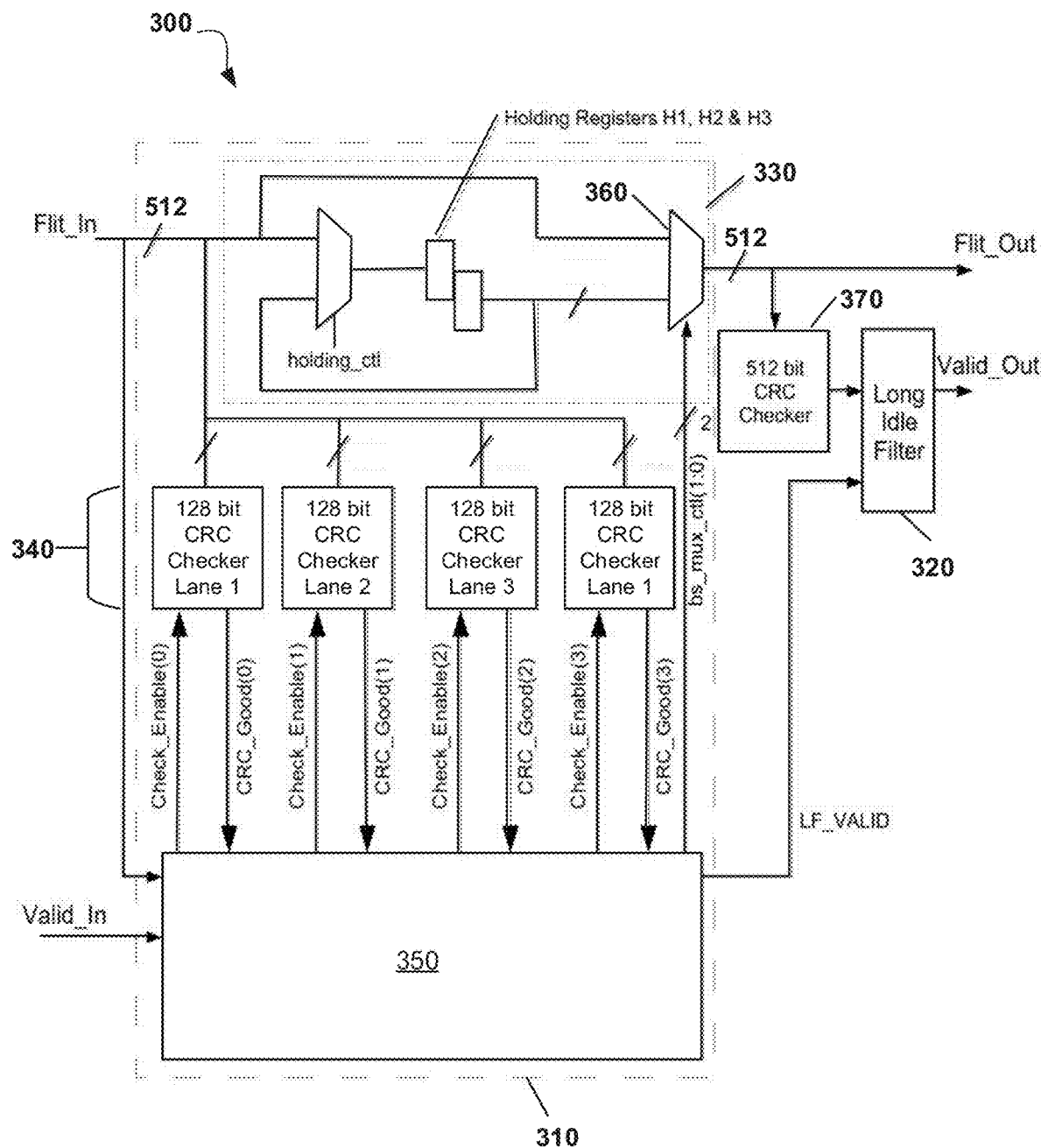
FIG. 3 is a schematic diagram of a Data Link (DL(X)) layer of a link interface according to an embodiment.

Referring now to FIG. 3, there is depicted a schematic diagram of a Data Link (DL or DLX) layer of a link interface according to an embodiment. FIG. 3 thus depicts how the Data Link (DL or DLX) layer is configured so as to remove Idle flits of a first size (e.g. Short Idle Flits), and to also remove Idle flits of a second, larger size (e.g. Long Idle Flits). Here, the Data Link (DL or DLX) layer comprises a Flit filter component 300 which is has two stages: a Short Idle Filter 310 and a Long Idle Filter 320.

The Short Idle Filter 310 comprises the following:
 a Barrel Shifter 330 which is configured to filter out any Short Idle Flits arriving on Flit_In and to collate the remaining Flit_In content (which will consist of partial Control, Idle or Data Flits) into complete 512-bit Flits to be presented to the Long Idle Filter 320;
 Four check blocks 340, one per lane, to verify the CRC of Short Idle Flits;
 A Finite State Machine (FSM) 350 which is configured to control the Barrel Shifter 330 and the four CRC check blocks 340.

The barrel shifter 330 comprises three 128-bit holding registers, H1, H2 & H3 which store the contents of lanes 1, 2 & 3, respectively, whenever the signal holding_ctl is set. The signal holding_ctl is active whenever Valid_in=1 and the current Flit_In state is not SSSS.

The output of the barrel shifter 330 is a multiplexor 360 which is configured to multiplex onto Flit_Out portions of the Flit_In bus and the holding registers, depending upon the state of a 4-bit control bus called bs_mux_ctl.

The output of the multiplexor 360 is given by the truth table Table 1 below:

TABLE 1

| bs_mux_ctl | | Flit_Out | | | |
|---|---|---|---|---|---|
| Bit 1 | Bit 0 | Lane 3 | Lane 2 | Lane 1 | Lane 0 |
| 0 | 0 | Flit_in Lane 3 | Flit_in Lane 2 | Flit_in Lane 1 | Flit_in Lane 0 |
| 0 | 1 | Flit_in Lane 2 | Flit_in Lane 1 | Flit_in Lane 0 | H3 |
| 1 | 0 | Flit_in Lane 1 | Flit_in Lane 0 | H3 | H2 |
| 1 | 1 | Flit_in Lane 0 | H3 | H2 | H1 |

The bs_mux_ctl is controlled by the FSM 350 which uses this bus to filter out any short idles appearing on Flit_In. In order to do this, the FSM determines the current state of Flit_In on each cycle and this may be based on what the state of Flit_In was on the previous cycle.

Figure 4:
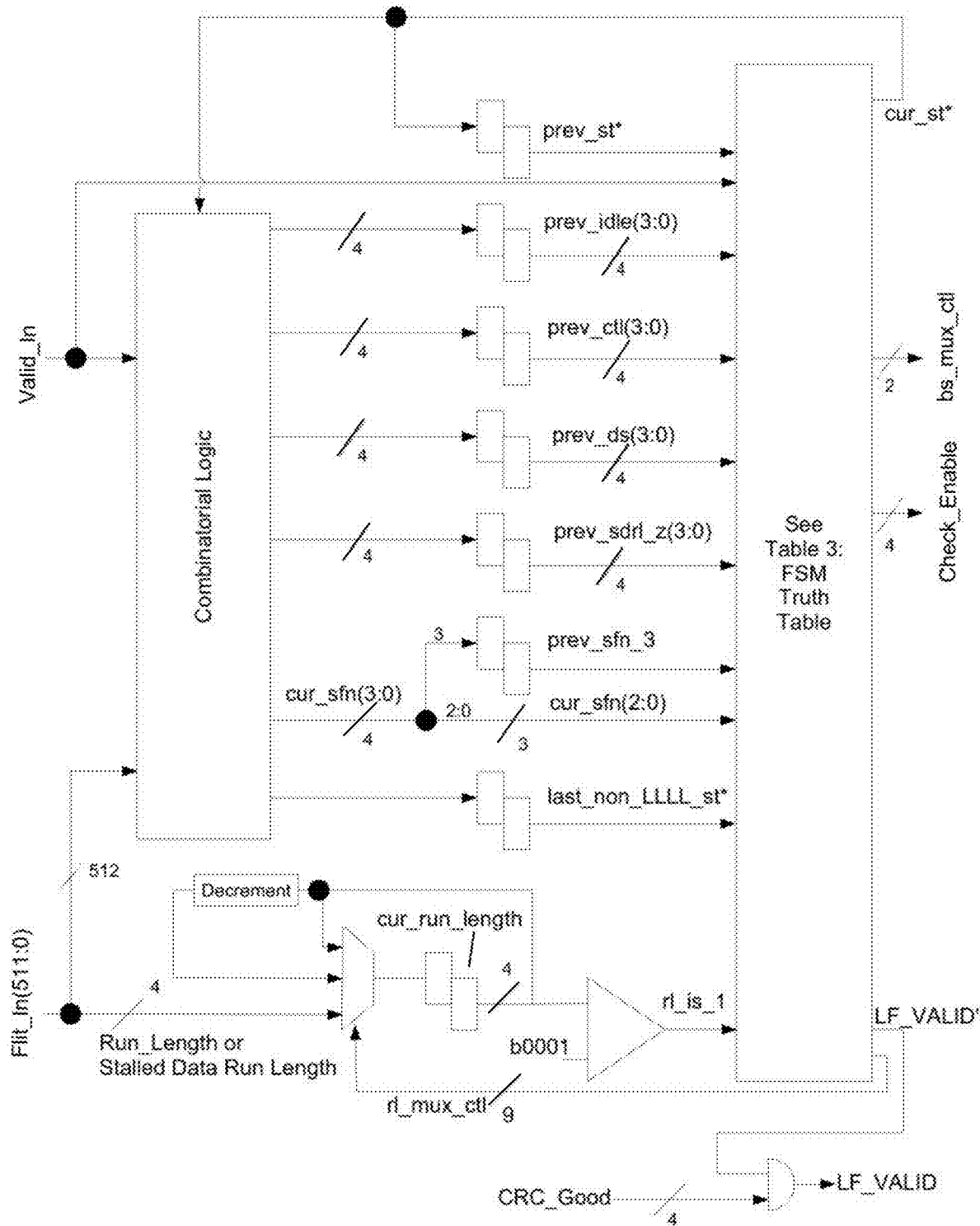
FIG. 4 is a schematic diagram of the Finite State Machine of FIG. 3 implemented as a Mealy State Machine.

By way of example, FIG. 4 depicts a schematic diagram of the FSM 350 of FIG. 3 implemented as a Mealy State Machine. The state of Flit_In on the previous cycle is held in a register called prev_st and also reflects state of the FSM. One of the outputs of the FSM is the current state of Flit_In, namely cur_st, which is then latched as prev_st. cur_st is also fed back and combined in a combinatorial logic block with DL content from the lanes of Flit_In to form its inputs.

cur_st indicates which Flit_In lanes contain valid DL content (i.e. lanes with D's or S's). This DL content is then used to derive the inputs of the FSM as follows. It is noted that some of these inputs are derived from registers which reflect what was DL content stored from the previous cycle. The range of n in each case is 0<=n<=3:
 Valid_In: This is the signal asserted by the PHY(X) layer to indicate that the contents of the Flit_In bus are valid;
 prev_idle: This is a 4-bit register. prev_idle(n)=1 indicates that the DL content of lane n indicated that the run length on the previous cycle was xF and thus denoted an Idle Flit;
 prev_ctl: This is a 4-bit register. prev_ctl(n)=1 indicates that the DL content of lane n on the previous cycle had a run length of zero which denoted a Control Flit with no data following it;
 prev_ds: This is a 4-bit register. prev_ds(n)=1 indicates that lane n contained the DL content for a Control Flit on the previous cycle and that that DL content had its Data Stalled bit set;
 prev_sdrl_z: This is a 4-bit register. prev_sdrl_z(n)=1 indicates that lane n contained the DL content for an Idle Flit on the previous cycle and that the Stalled Data Run Length field of that DL content was zero;
 cur_sfn: This is a 4-bit bus. If cur_sfn(n)=1 this indicates that the DL content currently on lane n has the Short Flit Next bit set and that that lane therefore currently contains a short idle. Note that only bits 0, 1 & 2 are inputs to the FSM. Bit 3 is stored in a register to form prev_sfn_3 below;
 prev_sfn_3: This is a 1-bit register which when set indicates that the DL content on lane 3 on the previous cycle had the Short Flit Next bit set and that therefore lane 3 previously contained a short idle;
 last_non_LLLL_st: This register records the last state of Flit_In (when Valid_In=1) which was NOT LLLL i.e. the last state to appear on Flit_In which had at least one lane with DL content;
 rl_is_1: As mentioned above, when the run length is not xF, it indicates the number of Data Flits that immediately follow a Control Flit or idle flit.

The FSM 350 of this example employs a register, called cur_run_length which is loaded with the run length indicated by the last Control Flit or the stalled data run length from the last idle flit. It decrements as each Data Flit is passed to TL(X) via the Long Idle Filter. When the cur_run_length register is 1 then rl_is_1=1.

The cur_run_length register is controlled from a 9-bit output bus, rl_ctl from the FSM. Each control bit in rl_mux_ctl is mutually exclusive and the effect of each control bit is defined in the truth table of Table 2 below.

of LF_VALID. Thus, LF_VALID can be prevented from being activated in the event of a Short Idle CRC fail.

The Long Idle Filter 320 is configured to receive the 512-bit output of the Short Idle Filter 310 and examines LF VALID.

When LF_VALID=1 then the 512-bit output from the Short Idle Filter is valid. The Long Idle Filter filters out any

TABLE 2

| | | | | rl_mux_ctl(8:0) | | | | | | |
|---|---|---|---|---|---|---|---|---|---|---|
| Bit 8 | Bit 7 | Bit 6 | Bit 5 | Bit 4 | Bit 3 | Bit 2 | Bit 1 | Bit 0 | cur_run_length(t+1) | Description |
| 0 | 0 | 0 | 0 | 0 | 0 | 0 | 0 | 0 | cur_run_length(t) | No Change |
| 1 | 0 | 0 | 0 | 0 | 0 | 0 | 0 | 0 | Flit_In(455:452) | Load cur_run_length register with Stalled Data Run Length from DL Content of Lane 3 |
| 0 | 1 | 0 | 0 | 0 | 0 | 0 | 0 | 0 | Flit_In(327:324) | Load cur_run_length register with Stalled Data Run Length from DL Content of Lane 2 |
| 0 | 0 | 1 | 0 | 0 | 0 | 0 | 0 | 0 | Flit_In(199:196) | Load cur_run_length register with Stalled Data Run Length from DL Content of Lane 1 |
| 0 | 0 | 0 | 1 | 0 | 0 | 0 | 0 | 0 | Flit_In(71:68) | Load cur_run_length register with Stalled Data Run Length from DL Content of Lane 0 |
| 0 | 0 | 0 | 0 | 1 | 0 | 0 | 0 | 0 | Flit_In(451:448) | Load cur_run_length register with Run Length from DL Content of Lane 3 |
| 0 | 0 | 0 | 0 | 0 | 1 | 0 | 0 | 0 | Flit_In(323:320) | Load cur_run_length register with Run Length from DL Content of Lane 2 |
| 0 | 0 | 0 | 0 | 0 | 0 | 1 | 0 | 0 | Flit_In(195:192) | Load cur_run_length register with Run Length from DL Content of Lane 1 |
| 0 | 0 | 0 | 0 | 0 | 0 | 0 | 1 | 0 | Flit_In(67:64) | Load cur_run_length register with Run Length from DL Content of Lane 0 |
| 0 | 0 | 0 | 0 | 0 | 0 | 0 | 0 | 1 | cur_run_length(t)-1 | Decrement cur_run_length register |

Table 2 above shows what the value of the register will be on cycle t+1 depending on the rl_mux_ctl bit that is currently active on cycle t.

FIGS. 5A-5F shows an exemplary truth table for the FSM 350. The truth table of FIGS. 5A-5F thus demonstrates an exemplary the FSM operation, i.e. how the FSM 350 transitions from state to state according to the previous and current state of Flit_In and when the FSM outputs are driven.

Although each lane could be one of three states: D, L or S, and there are four lanes (thus making a theoretical total of 81 Flit_In states), most of these are not possible. For example, it is impossible for a short idle to appear immediately after a Data Flit so a combination such as SLLL is not a valid state. In fact, there are only 15 possible legal Flit_In states which is reflected in the 15 possible states of the FSM 350. Any signal or register that stores a state i.e. prev_st, cur_st or last_non_LLLL_st could therefore be encoded as a 4 bit value or as a 15 bit one-hot bus.

The FSM 350 outputs an additional 4-bit bus called CRC_Check_Enable with each bit activating one of the four 128-bit CRC checkers 340 for Short Idles. The checkers 340 each return a signal which could be ANDed with the FSM output LF_Valid' to form the output to the Long Idle Filter Flits whose run length is xF (which will be Long Idle Flits) and for any flits that are not Long Idle Flit, asserts Valid_Out to indicate to the TL(X) layer that the contents of Flit_Out are valid.

If CRC checking is enabled, the Valid_Out signal can be further gated by CRC error indications from 512-bit CRC check block 370 shown in FIG. 3.

According to an alternative embodiment, a processor may be used to analyze the state of the Flit_In bus. Once the link has been trained, the state of Flit_In may initialize to a known state according to the particular transfer protocol being used (in the OpenCAPI specification, this would be DLLL for example).

Since valid combinations of D, L & S must appear at the Flit_In bus on each transfer cycle, the processor may determine from the state of Flit_In during the previous cycle where the DL content of Flits are in the state of Flit_In during the current cycle. Furthermore, examining this DL content in any one of the four lanes of Flit_In can then determine the state of the next adjacent lane, e.g. seeing that the SFN bit in lane 3 is set means that a short idle (an S) must exist in lane 0 on the next transfer cycle). Using this information, the processor may take the contents of the lanes of Flit_In, remove the short and long idles to form the contents of Flit_Out in which no idles appear.

By way of further example, an equivalent implementation of the FSM may be encoded in a memory device, such as a RAM or ROM device for example. The address of a location in the memory may then be formed from the inputs. The contents at that address would contain the outputs equivalent to those of the FSM, which could then be used to drive the filter components to remove idle flits. Accordingly, in such an alternative embodiment, a memory device may be configured to take the place of the FSM logic.

Figure 6:
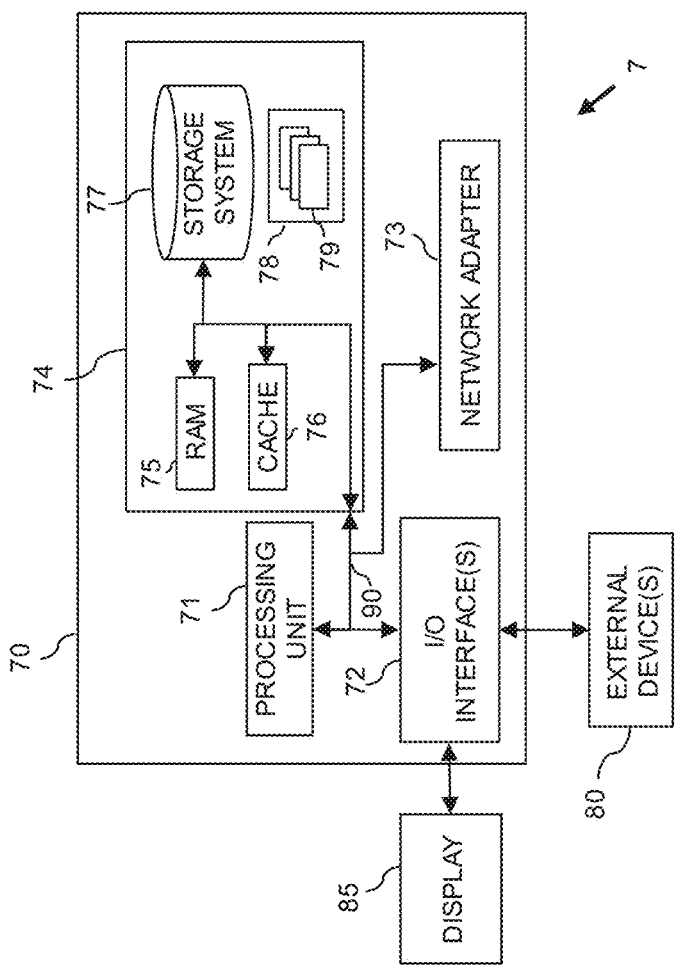
FIG. 6 illustrates a system according to an embodiment.

Embodiments may comprise a computer system 70, which may form part of a networked system 7 illustrated in FIG. 6. For instance, a link interface according to an embodiment may be implemented in the computer system 70 (e.g. as an I/O interface 72). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for according to a proposed embodiment.

Program/utility 78, having a set (at least one) of program modules 79, may be stored in memory 74. Program modules 79 generally carry out the functions and/or methodologies of proposed embodiments determining intent of a query provided to a QA system.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined query intent to a QA system or user).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that embodiments of the present invention are capable of being implemented within a cloud computing environment, or in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

What is claimed is:

1. A link interface of a communication protocol comprising:
    a physical layer of the communication protocol configured to transmit and receive flits via a link; and
    a data link layer configured to transmit and receive flits to/from the physical layer,
    wherein the communication protocol provides for idle flits of first and second sizes for maintaining link continuity, the first size being smaller than the second size,
    wherein the data link layer is configured to remove the idle flits of the first size received from the physical layer based on a flit type of a previous flit received from the physical layer for a previous processing cycle, and wherein Idle flits of the second size comprise flits with a run length of xF.

2. The link interface of claim 1, wherein the data link layer is further configured to remove Idle flits of the second size received from the physical layer.

3. The link interface of claim 1, wherein the flit filter component comprises a finite state machine configured to change states based on a type of the current flit and a type of the previous flit.

4. The link interface of claim 3, wherein the flit filter component comprises a barrel shifter comprising a plurality of registers of the first size, and wherein the finite state machine is adapted to control the barrel shifter based on its state.

5. The link interface of claim 1, wherein an idle flit of first size is n bits in length, wherein an idle flit of second size of m*n bits in length, and wherein n and m are integers.

6. The link interface of claim 5, wherein n=128, and wherein m=4.

7. The link interface of claim 1, wherein the communication protocol comprises the OpenCAPI protocol, and wherein an idle flit of the first size comprises a Short Idle Flit short idle flit, and wherein an idle flit of the second size comprises a long idle flit.

8. A computer-implemented method for a link interface of a communication protocol, the method comprising:
    at a physical layer of the link interface, transmitting and receiving flits via a link, the physical layer being of the communication protocol;
    at a data link layer of the link interface, transmitting and receiving flits to/from the physical layer,
    wherein the communication protocol provides for idle flits of first and second sizes for maintaining link continuity, the first size being smaller than the second size,
    wherein, at the data link layer of the link interface, removing idle flits of the first size received from the physical layer based on a flit type of a previous flit received from the physical layer for a previous processing cycle, and wherein idle flits of the second size comprise flits with a run length of xF.

9. The method of claim 8, further comprising:
    at the data link layer of the interface, removing idle flits of the second size received from the physical layer.

10. The method of claim 8, wherein removing idle flits of the first size received from the physical layer comprises:
    employing a finite state machine configured to change states based on a type of the current flit and a type of the previous flit.

11. The method of claim 10, wherein removing idle flits of the first size received from the physical layer further comprises:
    employing a barrel shifter comprising a plurality of registers of the first size, and wherein the finite state machine is adapted to control the barrel shifter based on its state.

12. The method of claim 8, wherein an idle flit of first size is n bits in length, wherein an idle flit of second size of m*n bits in length, and wherein n and m are integers.

13. The method of claim 12, wherein n=128, and wherein m=4.

14. The method of claim 8, wherein the communication protocol comprises the OpenCAPI protocol, and wherein an idle flits of the first size comprises a Short idle flit, and wherein an idle flit of the second size comprises a Long idle flit.

15. A computer program product comprising a computer readable storage medium having program instructions embodied therewith, the program instructions executable by a processing unit to cause the processing unit to perform, when run on a computer network, a method for a link interface of a communication protocol comprising the steps of:
    at a physical layer of the link interface, transmitting and receiving flits via a link, the physical layer being of the communication protocol;
    at a data link layer of the link interface, transmitting and receiving flits to/from the physical layer,
    wherein the communication protocol provides for idle flits of first and second sizes for maintaining link continuity, the first size being smaller than the second size,
    wherein, at the data link layer of the link interface, removing the idle flits of the first size received from the physical layer based on a flit type of a previous flit received from the physical layer for a previous processing cycle, and wherein idle flits of the second size comprise flits with a run length of xF.

* * * * *